(12) United States Patent
Puente et al.

(10) Patent No.: US 9,395,059 B2
(45) Date of Patent: Jul. 19, 2016

(54) LED ILLUMINATION WITH HEAT DISSIPATING HOUSING

(71) Applicant: Valeo Iluminacion Sociedad Anonima, Martos (ES)

(72) Inventors: Jean-Claude Puente, Livry Gargan (FR); Carlos Gomez, Martos (ES); Alain Jacq, Le Perreux sur Marne (FR); Eric Moisy, Jaean (FR)

(73) Assignee: Valeo Iluminacion Sociedad Anonima, Martos (ES)

( * ) Notice: Subject to any disclaimer, the term of this patent is extended or adjusted under 35 U.S.C. 154(b) by 209 days.

(21) Appl. No.: 14/099,047

(22) Filed: Dec. 6, 2013

(65) Prior Publication Data

US 2014/0160781 A1 Jun. 12, 2014

(30) Foreign Application Priority Data

Dec. 7, 2012 (FR) ...................... 12 61775

(51) Int. Cl.
*F21V 29/00* (2015.01)
*F21S 8/10* (2006.01)
*B60Q 1/20* (2006.01)

(52) U.S. Cl.
CPC . *F21S 48/13* (2013.01); *B60Q 1/20* (2013.01); *F21S 48/1104* (2013.01); *F21S 48/1159* (2013.01); *F21S 48/1208* (2013.01); *F21S 48/1233* (2013.01); *F21S 48/1352* (2013.01); *F21S 48/142* (2013.01); *F21S 48/328* (2013.01)

(58) Field of Classification Search
CPC ..... F21S 8/10; F21W 2101/10; F21V 29/004; F21V 29/2212; F21V 29/70; F21V 29/74; F21V 29/745; F21V 29/76; F21V 29/763; H01L 33/64; B60Q 1/04
See application file for complete search history.

(56) References Cited

U.S. PATENT DOCUMENTS

| 7,306,352 | B2* | 12/2007 | Sokolov | G02B 5/12 362/297 |
|---|---|---|---|---|
| 7,794,128 | B2* | 9/2010 | Fujiwara | B60Q 1/0041 362/459 |
| 7,824,076 | B2 | 11/2010 | Koester | |
| 7,874,700 | B2* | 1/2011 | Patrick | F21V 15/01 362/218 |
| 8,201,980 | B2* | 6/2012 | Ookubo | F21S 48/1159 362/283 |
| 8,240,896 | B2* | 8/2012 | Abe | F21S 48/1159 362/281 |
| 8,475,021 | B2* | 7/2013 | Iwasaki | F21S 48/1757 362/281 |
| 8,845,161 | B2* | 9/2014 | DiPenti | F21S 48/1104 362/373 |
| 8,851,723 | B2* | 10/2014 | Peck | F21S 48/1159 362/294 |
| 8,899,803 | B2* | 12/2014 | Marley | F21S 48/115 362/516 |
| 8,974,100 | B2* | 3/2015 | Monma | F21S 48/00 362/294 |
| 2008/0225544 | A1 | 9/2008 | Fujiwara et al. | |
| 2009/0002997 | A1 | 1/2009 | Koester | |
| 2011/0149584 | A1* | 6/2011 | Stade | B60Q 1/0058 362/512 |

(Continued)

FOREIGN PATENT DOCUMENTS

| CN | 201386966 | 1/2010 |
|---|---|---|
| DE | 102006046167 | 4/2008 |

(Continued)

*Primary Examiner* — Ismael Negron
(74) *Attorney, Agent, or Firm* — Jacox, Meckstroth & Jenkins

(57) ABSTRACT

A light-emitting device including a light source with at least one light-emitting diode, and a housing defining an enclosure for the light source, the light source being in thermal contact with the housing to dissipate heat released by the light source, the housing including a hollow rib.

19 Claims, 2 Drawing Sheets

(56) References Cited

U.S. PATENT DOCUMENTS

Figure 1:
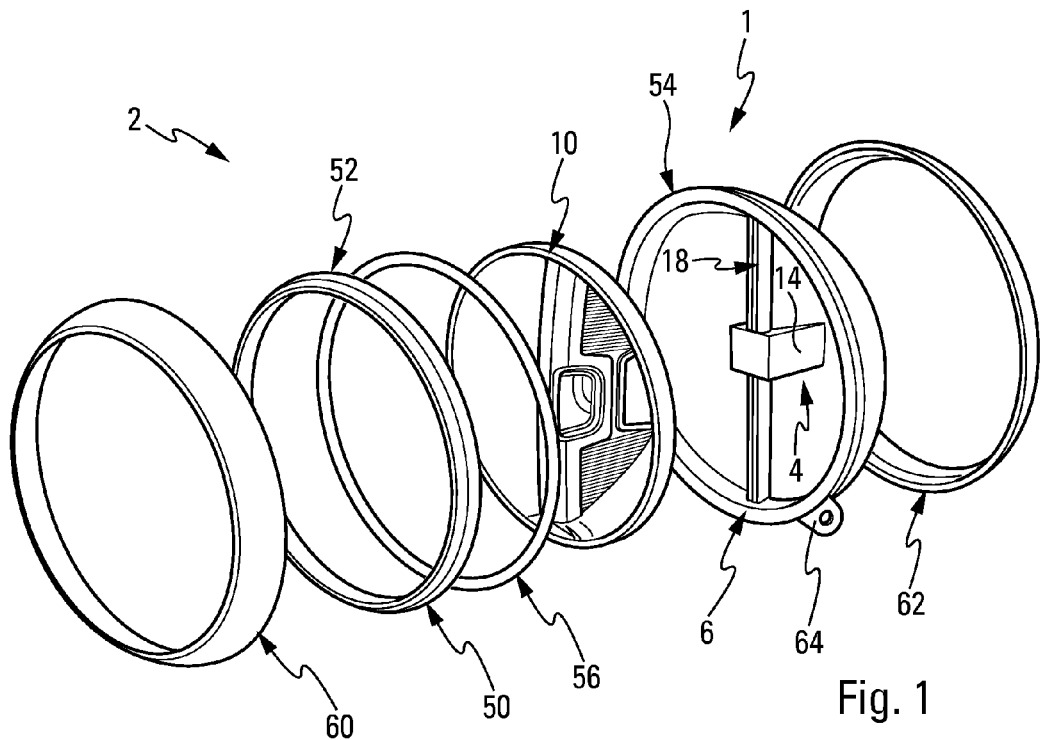

2011/0170310 A1* 7/2011 Haenen ............... F21S 48/1159
 362/516
2014/0355286 A1* 12/2014 Arita .................. F21S 48/1323
 362/516

FOREIGN PATENT DOCUMENTS

| FR | 2913752 | 9/2008 |
| SG | 172770 | 8/2011 |
| WO | 2010069159 | 6/2010 |

* cited by examiner

LED ILLUMINATION WITH HEAT DISSIPATING HOUSING

CROSS-REFERENCE TO RELATED APPLICATIONS

This application claims priority to French Application No. 1261775 filed Dec. 7, 2012.

BACKGROUND OF THE INVENTION

1. Field of the Invention

The present invention relates to a light-emitting device for a motor vehicle headlamp and also to a headlamp equipped with the device. Although provided more particularly for use in foglamps, the invention may also be used in high-beam lamps, low-beam lamps or any other type of vehicle headlamp that is used to light the roadway.

2. Description of the Related Art

Headlamps that use light-emitting diodes as light sources are known. Although such sources are sometimes known as cold sources since they produce little or no radiant heat, they need to be cooled. This is because an excessive increase in the temperature impairs the intensity of the beam emitted. In addition, it poses a risk for their supply of current, since the latter is realized by virtue of a connection which would become defective if the temperature exceeded a particular threshold.

In order to solve this problem, it is currently known to provide such headlamps with a heat dissipation device, such as a finned radiator, in a heat exchange relationship with the diodes. An opening is made in the housing of the headlamp so that the radiator can emerge therefrom and exchange heat by natural convection with the ambient air outside the housing.

Such a solution increases the number of components to be employed. In addition, it has a limited aesthetic nature, which is not of course of consequence as long as the housing of the headlamp is concealed under the body of the vehicle, but which is not satisfactory when the headlamp is visible, in particular in the case of additional headlamps, that is to say headlamps intended to be mounted on the outside of the vehicle.

SUMMARY OF THE INVENTION

The invention has the aim of remedying the above-mentioned drawbacks and to this end proposes a light-emitting and roadway-lighting device for a motor vehicle, the light-emitting device comprising a light source and a housing defining an enclosure for the light source, the light source being in thermal contact with the housing, the housing being designed to allow thermal dissipation of the heat released by the light source.

By using the housing as a heat sink, the number of components is limited. The use of a component emerging through the housing is also avoided and it is thus easier to obtain a headlamp having a more attractive appearance.

According to various features of the invention which may be taken together or separately:
   the light-emitting device is designed to concentrate a light beam emitted by the light source so as to shape the beam emitted by the device,
   the light-emitting device comprises a reflector reflecting a part of the beam emitted by the light source so as to shape the beam emitted by the device,
   the light source comprises at least one light-emitting diode,
   the housing comprises at least one hollow rib that increases the heat exchange surface area,
   the hollow rib is oriented toward the inside and/or the outside of the housing,
   the hollow rib comprises two flanks connected by a bottom,
   the hollow rib, as seen from outside the housing, forms a groove,
   the light source is provided in the region of the hollow rib,
   the hollow rib is made from the same material as the housing,
   the hollow rib is designed such that the light source is located approximately at a focus of the reflector,
   the reflector and the hollow rib are mutually designed to allow the reflector to be centered on the housing,
   the hollow rib is furnished with heat dissipation fins,
   the fins are located in the groove,
   the fins are located outside the enclosure defined by the housing,
   the fins are located within the volume of the housing, that is to say that they do not protrude beyond the outer surface of the housing,
   the hollow rib has a longitudinal axis of extension,
   the fins are transverse to the direction of extension of the hollow rib,
   the fins extend from the bottom of the hollow rib to edges of the flanks thereof, opposite the bottom, and/or from one of the flanks to the other,
   the fins are at least provided in the vicinity of a part of the hollow rib carrying the light source,
   the fins are distributed regularly along the hollow rib,
   the housing comprises flanges for fixing to a support, the flanges being located on either side of the hollow rib, at one of the ends thereof.

It may be noted that if the size of the heat exchange surfaces formed by the abovementioned fins is limited, this difficulty is compensated by the temperature of the ambient air in contact with the heat exchange surfaces, at least in the case of additional headlamps. Specifically, unlike headlamps located permanently on the vehicles, for which the thermal dissipation part is located under the hood, that is to say in an environment in which the temperature is traditionally high on account of the heat released by the engine of the vehicle, the headlamps are in this case intended to be placed in the ambient outside air, that is to say in an environment in which the temperature is generally cool, or even cold, under the conditions in which the headlamps are generally used, at night or in the event of fog.

The invention also relates to a motor vehicle headlamp comprising the light-emitting device as described above.

These and other objects and advantages of the invention will be apparent from the following description, the accompanying drawings and the appended claims.

BRIEF DESCRIPTION OF THE ACCOMPANYING DRAWINGS

Figure 2:
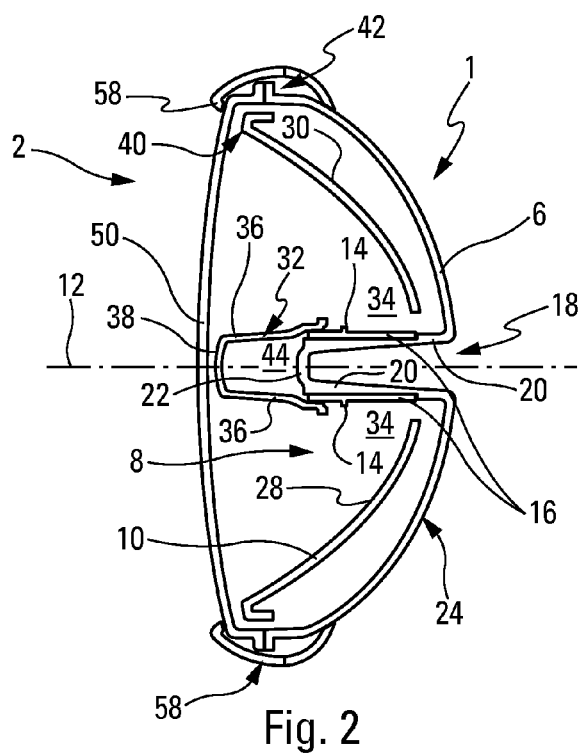
Figure 3:
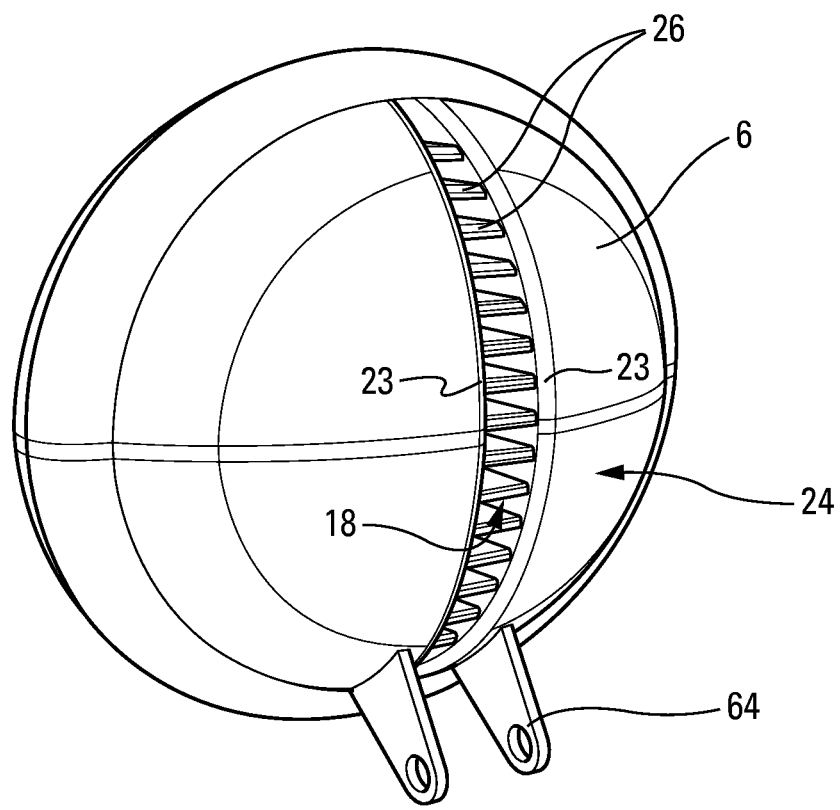

Further features and advantages of the invention will become apparent from reading the following detailed description, in order to understand which reference is made to the appended drawings, in which:
   FIG. 1 is an exploded perspective view of one exemplary embodiment of the light-emitting device and of the headlamp according to the invention;
   FIG. 2 schematically illustrates, in a radial section plane, the emitting device and the headlamp from FIG. 1;

FIG. 3 is a perspective rear view of the emitting device and of the headlamp from FIG. 1

DETAILED DESCRIPTION OF THE PREFERRED EMBODIMENTS

As illustrated in FIGS. 1 and 2, the invention firstly relates to a light-emitting device 1 for a motor vehicle headlamp 2.

This light-emitting device 1 comprises a light source 4 and a housing 6 which defines an enclosure 8 for the light source 4.

This light-emitting device 1 is advantageously designed to concentrate one or more light beams emitted by the light source 4. For this purpose, it comprises a reflector 10 for reflecting the beam or beams emitted by the light source 4. In an alternative or combined manner, it may of course comprise any other optical element, such as lenses, for directing while intensifying the beam or beams emitted by the light source 4. In this way, the beam emitted by the light-emitting device 1, which could in particular be located inside an emission cone centered on an optical axis 12 of the light-emitting device, is shaped.

The light source 4 comprises at least one light-emitting diode 14. There are two of them in this case. They are placed, for example, on a support 16 such as, in particular, an insulated metal substrate, for supplying the diodes 14 with electricity. The supports 16 may also incorporate electronic components (not shown) which are involved in the control of the diodes 14.

According to the invention, the light source 4 is in thermal contact with the housing 6, the latter being designed to allow thermal dissipation of the heat released by the light source 4.

To this end, the housing 6 may be produced, for example, from a metal material such as aluminum or an aluminum alloy, or any other metal or metal alloy that has good thermal conductivity. As explained in the following text, it advantageously has one or more forms that favor the presence of surfaces for heat exchange with the ambient air.

This provides a solution in which the function of cooling the light source 4 is carried out by the housing 6 itself, thereby making it possible to reduce the number of components and to give the equipped headlamp an advantageous appearance.

As can be seen more particularly in FIGS. 2 and 3, the housing 6 may comprise one or more hollow ribs 18, in this case a single hollow rib, in the region of which the light source 4 is provided. In FIG. 2, the hollow rib 18 is oriented orthogonally to the section plane. It comprises flanks 20, connected here by a bottom 22, producing a first increase in the heat exchange surface area provided by the housing 6. The hollow rib 18 has a U-shaped section, the flanks 20 being approximately parallel.

The hollow rib 18 is advantageously made from the same material as the housing 6. In other words, the housing 6 and the hollow rib 18 form one and the same single component.

The housing 6 comprises, for example, a bottom 24 having an axisymmetrical form, interrupted by the hollow rib 18, the latter being located on either side of a plane of symmetry passing through the optical axis 12 of the device, orthogonal to the section plane in FIG. 2. The shape of the bottom 24 of the housing 6 corresponds, for example, to a spherical cap and/or ellipsoid of revolution.

The flanks 20 of the hollow rib 18 thus have outer edges 23 in the form of an arc of a circle and/or ellipse. The flanks 20 are connected here to the bottom 22 of the hollow rib 18 in a rectilinear manner. The latter is domed slightly toward the inside of the enclosure 8.

In order to further improve heat exchange, the hollow rib 18 may be furnished with heat dissipation fins 26. They are located here outside the enclosure 8 defined by the housing 6.

Advantageously, the extension given to the fins 26 limits them in the volume provided by the bottom 24 of the housing 6: the fins 26 do not pass beyond the outer surface of the housing 6. This level of integration helps to give the device according to the invention a favorable appearance.

More specifically, the hollow rib 18 has in this case a longitudinal axis of extension, orthogonal to the optical axis 12, and the fins 26 are transverse to the longitudinal direction of extension of the hollow rib 18. They extend, for example, from the bottom 22 of the hollow rib 18 to the edges 23 thereof and/or from one flank 20 of the hollow rib 18 to the other.

As a variant, they may be parallel to the axis of extension or have any other orientation that is favorable to circulation of air by natural convection.

The fins 26 are at least provided in the vicinity of a part of the hollow rib 18 carrying the light source 4, in particular in the region of the supports 16. The fins 26 are in this case distributed regularly along the hollow rib 18. However, any other distribution is possible.

In order to further improve the appearance of the housing 6, the latter will advantageously have a smooth outer surface, that is to say one without forms or other fins that are intended to increase the heat exchange surface area, outside the hollow rib or ribs 18.

Referring once again to FIGS. 1 and 2, it can be seen that the reflector 10 may have one or more foci and that the hollow rib 18 is designed such that the light source 4, namely the diodes 14 in this case, is located substantially at the foci. The reflector 10 may in particular be designed such that the light rays emitted by the diodes 14 are reflected parallel to one another, in the direction of the optical axis 12. To this end, the reflector 10 comprises in this case two bottoms 28, 30 in the form of portions of a paraboloid of revolution.

The reflector 10 and the hollow rib 18 of the housing 6 may be mutually designed to allow the reflector 10 to be centered on the housing 6. The reflector 10 may in particular be provided with a hollow rib 32 covering the hollow rib 18 of the housing 6, the hollow rib 32 of the reflector 10 connecting the bottom parts 28, 30 of the reflector 10. The hollow rib 32 of the reflector 10 is provided with one or more windows 34 for the passage of the beam emitted by the light source, the windows being located in this case opposite the diodes 14.

The reflector 10 may be symmetrical with respect to the abovementioned plane of symmetry. The hollow rib 32 thereof comprises, for example, two flanks 36, in which the windows 34 are respectively formed. The flanks 36 of this hollow rib 32 of the reflector 10 are connected, in particular, by a bottom 38, which is slightly convex in this case.

This reflector 10 has a peripheral edge 40 projecting with respect to a peripheral edge 42 of the housing 6. The bottom 38 of the hollow rib 32 of the reflector 10 projects with respect to the peripheral edge 40 of the reflector 10. The bottom 22 of the hollow rib 18 of the housing 6 is set back with respect to the peripheral edge 42 of the housing 6. The light-emitting device 1 comprises a cavity 44 between the bottom 22 of the hollow rib 18 of the housing 6 and the hollow rib 32 of the reflector 10.

The invention also relates to a headlamp 2 comprising the emitting device 1.

With reference to FIG. 1, the headlamp 2 may also comprise a closing outer lens 50 and optionally a style part, or mask, located between the closing outer lens 50 and the reflector 10, along the optical axis of the emitting device.

The outer lens 50 and/or the housing 6 may each comprise a lip 52, 54 for bearing against one another. They are secured together, for example, by a double-sided adhesive 56, placed in this case between the lips 52, 54.

The headlamp 2 also comprises a trim ring 58, for example, in two annular parts 60, 62 that are axially joined together. This ring 58 makes it possible in particular to conceal the connection between the outer lens 50 and the housing 6.

The housing 6 may comprise flanges 64 for fixing to a support, in particular a support mounted on a motor vehicle (not shown). The flanges 64 are located in this case on either side of the hollow rib 18 of the housing 6, at one of the longitudinal ends thereof. They are designed to allow, in use, an adjustment of the inclination of the beam emitted by the headlamp 2 with respect to the horizontal.

The headlamp 2 may in particular be used as a foglamp, although this application should not be considered limiting in anyway.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A light-emitting device for a motor vehicle headlamp, said light-emitting device comprising:
    at least one light source;
    a housing defining an enclosure for said least one light source, said at least one light source being in thermal contact with said housing, wherein said housing allows thermal dissipation of the heat released by said at least one light source, wherein said housing comprises a hollow rib that is integrally formed in or directly coupled to said housing and being in thermal contact with said at least one light source and dissipating heat released by said at least one light source to said housing; and
    a reflector having a focus, said reflector reflecting a part of the beam emitting by said at least one light source so as to shape the beam emitted by said device.

2. The light-emitting device according to claim 1, wherein said housing comprises flanges for fixing to a support, said flanges being located on either side of said hollow rib, at one of the ends thereof.

3. A motor vehicle headlamp comprising the light-emitting device according to claim 1, and mounted on a motor vehicle.

4. The light-emitting device according to claim 1, wherein said at least one light source is provided in the region of said hollow rib.

5. The light-emitting device according to claim 4, also comprising a reflector having a focus, said reflector reflecting a part of the beam emitted by said at least one light source so as to shape the beam emitted by said device.

6. The light-emitting device according to claim 1, wherein said at least one light source comprises at least one light-emitting diode.

7. The light-emitting device according to claim 6, wherein said at least one light source is provided in the region of said hollow rib.

8. The light-emitting device according to claim 6, also comprising a reflector having a focus, said reflector reflecting a part of the beam emitted by said at least one light source so as to shape the beam emitted by said device.

9. The light-emitting device according to claim 1, wherein said at least on light source is supported by said hollow rib proximate said focus.

10. The light-emitting device according to claim 9, wherein said reflector and said hollow rib are mutually designed to allow said reflector to be centered on said housing.

11. The light-emitting device according to claim 1, wherein said reflector is centered on said housing.

12. The light-emitting device according to claim 11, wherein said hollow rib is furnished with a plurality of heat dissipation fins.

13. The light-emitting device according to claim 1, wherein said hollow rib comprises a plurality of heat dissipation fins.

14. The light-emitting device according to claim 13, wherein said plurality of heat dissipation fins are located on the outside of said enclosure defined by said housing.

15. The light-emitting device according to claim 13, wherein said housing comprises an outer wall, said plurality of heat dissipation fins do not extend beyond said outer wall of said housing.

16. The light-emitting device according to claim 13, wherein said hollow rib has a longitudinal axis of extension transverse to an optical axis of the light-emitting device.

17. The light-emitting device according to claim 16, wherein said plurality of heat dissipation fins are transverse to said direction of extension of said hollow rib.

18. The light-emitting device according to claim 17, wherein said plurality of heat dissipation fins are at least provided in the vicinity of a part of said hollow rib carrying said at least one light source.

19. A light-emitting device for a motor vehicle headlamp, said light-emitting device comprising at least one light source and a housing defining an enclosure for said at least one light source, said at least one light source being in thermal contact with said housing, wherein said housing allows thermal dissipation of heat released by said at least one light source, wherein said housing comprises a hollow rib that is integrally formed in or coupled to said housing and being in thermal contact with said at least one light source and dissipating heat released by said at least one light source to said housing;
    wherein said hollow rib comprises a plurality of heat dissipation fins;
    wherein said hollow rib has a longitudinal axis extension transverse to an optical axis of the light-emitting device;
    wherein said plurality of heat dissipation fins are transverse to said direction of extension of said hollow rib;
    wherein said plurality of heat dissipation fins are at least provided in the vicinity of part of said hollow rib carrying said at least one light source;
    wherein said plurality of heat dissipation fins are distributed regularly along said hollow rib.

* * * * *